United States Patent [19]

Kohler et al.

[11] Patent Number: 5,119,995
[45] Date of Patent: Jun. 9, 1992

[54] KEYWAY FOR REFINER DISC

[75] Inventors: Gregory R. Kohler, Williamsport; Gary L. Jackson, Montoursville, both of Pa.

[73] Assignee: Andritz Sprout-Bauer, Inc., Muncy, Pa.

[21] Appl. No.: 616,230
[22] Filed: Nov. 20, 1990
[51] Int. Cl.⁵ .............................................. B02C 7/16
[52] U.S. Cl. .................................. 241/261.2; 241/296; 403/356
[58] Field of Search ............... 403/356, 358, 375, 383; 241/294, 295, 296, 297, 298, 261.2, 261.3

[56] References Cited

U.S. PATENT DOCUMENTS 3,014,671 12/1961 Thompson ........................ 241/296
3,260,469 7/1966 Perdreau .
3,487,903 1/1970 Stickan ............................ 403/356 X
4,586,662 5/1986 Goldenberg et al. .
4,783,014 11/1988 Fredriksson et al. ............ 241/297 X
4,826,347 5/1989 Baril et al. ....................... 403/383 X

FOREIGN PATENT DOCUMENTS 357967 11/1905 France ................................ 403/358
1254865 11/1971 United Kingdom ................ 403/383

Primary Examiner—Mark Rosenbaum
Attorney, Agent, or Firm—Chilton, Alix & Van Kirk

[57] ABSTRACT

A rotor member (10,000) having a central bore wall (18,118) that is rigidly connected to a shaft (12,112) by a thermally-induced interference fit and by radially extending, interlocking complementary formations, wherein said formations include a key (20,120) projecting from the shaft into a substantially semi-elliptical keyway recess (22,122) in the bore wall.

10 Claims, 3 Drawing Sheets

KEYWAY FOR REFINER DISC

BACKGROUND OF THE INVENTION

The present invention relates to the attachment of discs or wheels to shafts, and more particularly, to the attachment of a disc to a shaft in a pulp refiner or similar apparatus.

In attaching wheels to discs or shafts, it is common practice to use keys in keyways and/or thermally-induced interference fit to hold the disc in place and to transmit torque. Examples of such connections appear in FIG. 3 of U.S. Pat. No. 3,260,469, and FIG. 2 of U.S. Pat. No. 4,586,662. In high speed operation, it may be necessary to use a considerable amount of interference fit to compensate for thermal growth and the stretching of the bore opening resulting from centrifugal force. The combination of high thermally-induced interference and a keyway produces high localized stresses in the corners of the keyway, due to the abrupt change in cross-section.

The radius in the corner of the keyway is known to have a considerable influence on the peak stress. In rectangular keyways, the ratio of the peak to average bore stress, is typically about 4.0. In semicircular keyways, the peak to average stress ratio is somewhat lower, at about 3.0. Nevertheless, it is desirable that the peak to average stress ratio be further reduced.

SUMMARY OF THE INVENTION

It is, accordingly, an object of the invention to minimize the peak to average stress ratio associated with a key and keyway engagement between a wheel or disc, and its associated rotatable shaft.

More particularly, it is an object of the invention to minimize the peak stress relative to the average bore stress resulting from the use of thermally-induced interference fit in combination with a key projecting from a shaft into a keyway in the bore of a refiner disc.

In accordance with the invention, the cross section of the keyway in the bore and preferably the key formation on the shaft, are provided in the form of one-half of an ellipse. In cross-section, the semi-elliptical keyway formation has the minor axis extending substantially along a radius of the shaft and the major axis oriented perpendicular to the minor axis.

The semi-elliptical keyway reduces peak stresses to a ratio approaching 2.0 times the bore average stress. The semi-elliptical shape produces a more gradual flow of circumferential stresses along the curvature of the keyway resulting from interference fit, centrifugal forces and torque transferred from the projecting key formation on the shaft. The projection from the shaft may either be integral with the shaft, or, particularly in equipment used in pulp refiners and the like, a separate key member removably fits in a shaft keyway. Although the shaft keyway and associated key formation are optimized in the preferred embodiment to match at least in part the semi-elliptical shape of the bore keyway, the shape of the key is less important than the shape of the keyway in the bore.

Especially in a refiner, the shaft is secured to the disc by heating the disc to enlarge the bore, passing the shaft through the bore, and then permitting the bore to contract and "squeeze" down on the shaft, thereby effecting a strong interference fit ("thermally- induced interference"). Nevertheless, to assure that the connection between the disc and the shaft can carry all the steady state and transient loads necessary to keep the disc in place, a key and keyway connection is provided in addition to the thermally induced interference fit. The disc must stay fixed to the shaft during a variety of loaded conditions including (1) the disc temperature rising significantly above the shaft temperature as a result of process heat in the refining zone between discs, thereby causing differential expansion and a corresponding reduction in the interference fit between the disc and shaft; (2) torsional oscillations during starting of coupled synchronous or induction motors which can result in peak torques of 2 to 6 times rated torque; and (3) axial loading resulting from the processing of the feedstock.

The greater importance of the shape of the keyway in the bore, arises from the fact that the dominant stress in a refiner disc on a shaft which rotates at, for example, 1200, 1500, or 1800 rpm, is circumferential. This stress is mainly the result of the thermally-induced interference fit, i.e., the nominal shaft diameter is larger than the nominal bore diameter. Another major source of stress arises from the centrifugal forces of the disc and attached segmented plates. The keyway recess in the bore serves as a obstacle to the uniform distribution of stresses around the bore. The more abrupt the change in section, the higher the localized stress.

Typical keyway recesses are cut in a rectangular shape with straight sides and top, with no radius at the corners. This produces a peak stress at the sharp corner of about 4.8 times the average stress around the bore. This ratio will also be referred to herein as the stress concentration factor. The semi-elliptical shape of the bore keyway in accordance with the present invention, produces a significantly lower stress concentration factor than any other known configuration, including rectangular without radiused corners, rectangular with radiused corners, or semicircular.

Thus, it can be appreciated that with the present invention the cross-section or profile of the key itself, need not necessarily match the substantially semi-elliptical shape of the keyway recess in the bore. The shape of the key projection can be simplified and, therefore, the more complex and costly machining for producing a semi-elliptical key can be avoided. The important consideration for the projecting key is that a sufficient radius be provided on the flanks so as to approximate the shape of the keyway in the bore on the surfaces where torque is transmitted between the key and keyway.

BRIEF DESCRIPTION OF THE DRAWINGS

These and other objects and advantages of the invention are described below with reference to the accompanying drawings, in which.

DESCRIPTION OF THE PREFERRED EMBODIMENT

Figure 1:
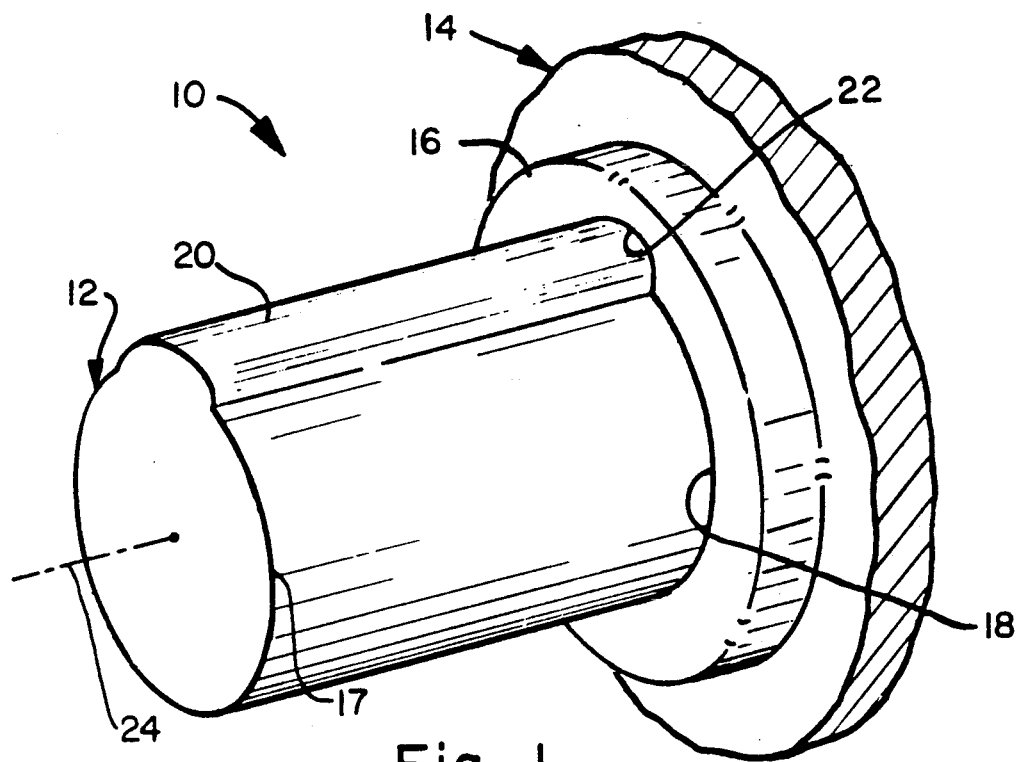
FIG. 1 is a perspective view of a disc and associated shaft, showing a semi-elliptical key projecting from the shaft and interlocked with a complementary keyway in the bore of the hub portion of the disc.

FIG. 1 schematically shows a portion 10 of a rotating machine such as a refiner or the like, having a rotatable shaft 12 which is connected coaxially to a disc 14, preferably through a hub portion 16. The shaft 12 typically has a circular perimeter 17 that is closely spaced from the substantially circular bore 18 in hub 16, except for the key formation 20 projecting from the shaft 12 so as to interengage with mating keyway 22 formed as a recess in the bore 18 of the hub 16. As is well known in the general practice of mechanics, rotation of the shaft 12 about axis 24, causes key 20 to bear upon keyway 22 and thus transmit the torque of rotation to the disc 14. Additional details of the construction and operation of a typical pulp refiner may be found in U.S. Pat. No. 3,893,631, "Twin Refiners with Double Floating Discs" (Fisher et al, 1975), the disclosure of which is hereby incorporated by reference.

Figure 2:
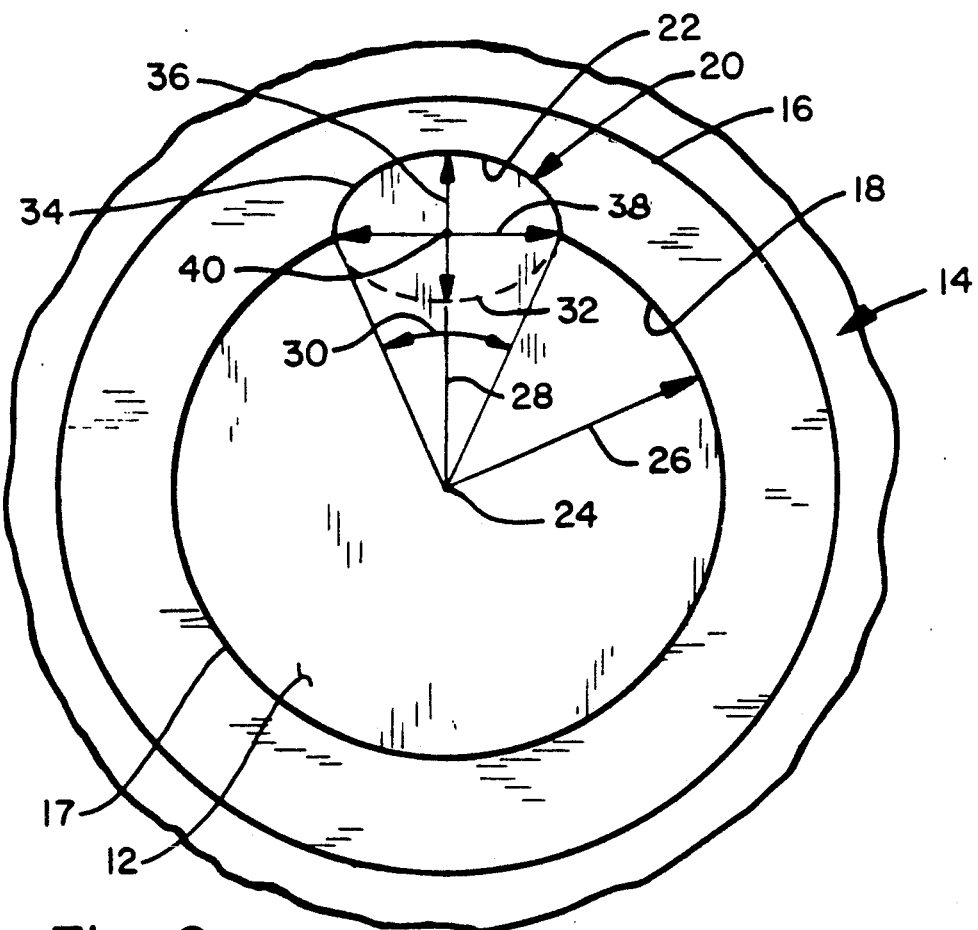
FIG. 2 is a diagram of a representative implementation of the invention, annotated to define some of the terminology used in the present specification.

FIG. 2 is a diagrammatic section view of a shaft 12 and associated disc 14, with the salient features of the invention identified. The shaft radius 26 (and bore inner radius) extends from the axis 24 to the circular portion of shaft perimeter 17. The key formation 20 has a formation radius 28 defined as the perpendicular distance from the axis 24 to the point on the outer surface 34 of the formation that is farthest from the axis 24.

The formation span 30 is defined as the angle included between the left and right hand rises of the formation from the circular portion of the shaft perimeter 17. The key formation 20 has a discernible, semi-elliptical outer surface 34 as viewed in section, i.e., in a direction parallel to the shaft rotation axis 24. The semi-elliptical surface 34 defines the dimensions of a full ellipse 32 (partially shown in phantom), having a center 40 through which the ellipse minor axis 36 and major axis 38 intersect orthogonally. The minor axis 36 lies on the formation radius 28 and is smaller than the major axis 38. The same parameters may be similarly defined with respect to the keyway 22, when the keyway is symmetrically centered about the key formation radius 28. In the embodiment illustrated in FIG. 2, the keyway parameters are substantially equal to the corresponding key parameters. In other embodiments, such as described below with respect to FIG. 5, certain bore keyway parameters may be larger than the corresponding key parameters.

Figure 3:
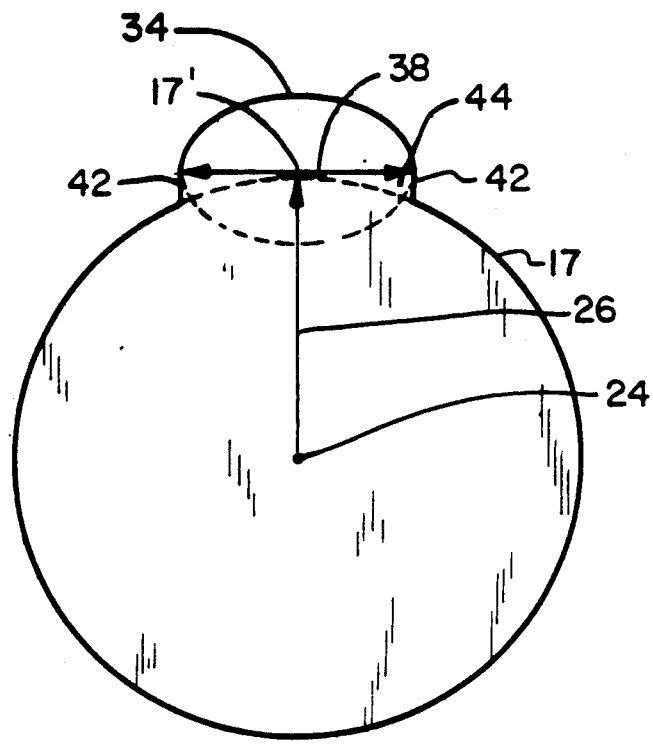
FIG. 3 is a section view of a shaft in accordance with an implementation of the invention wherein the semi-elliptical formation extends radially from a pedestal portion on the shaft.

FIG. 3 illustrates another embodiment of the invention, wherein the major axis of 38 of the semi-ellipse 34 of the projecting formation 20, lies entirely outside the imaginary completion 17, of the circular perimeter 17 from which the formation appears to project. In particular, the semi-ellipse 34 projects from a pedestal 44 having opposed walls 42 that extend parallel to the shaft axis 24 for a convenient distance at least equal to the axial depth of keyway 22. The walls 42 extend outwardly from the shaft body on either side of the ellipse minor axis and parallel to the formation radius defined in FIG. 2. The major axis 38 passes perpendicularly through the top of the side walls 42. As previously noted, the keyway associated with this type of key has corresponding parameters.

Referring again to FIG. 2, it is believed that the advantage of the invention relative to the known key and keyway arrangements, is achieved when the aspect of the ellipse as defined by the ratio of the keyway minor axis 36($a_1$) to the keyway major axis 38 ($a_2$) falls within the following range:

$$0.40 \leq a_1/a_2 \leq 0.90$$

The formation span angle 30, is preferably in the range between about 5 and 30 degrees. It is believed that the optimum formation has an aspect ratio $a_1/a_2$ between about 0.55–0.65, and a span of about 10–20 degrees. Of course, those skilled in the field of mechanics will recognize that the optimization of these variables depends on the types and strengths of the shaft and hub materials, the nature of the interference fit, centrifugal force and torque applied to the bore, and ease of manufacturability.

Figure 4:
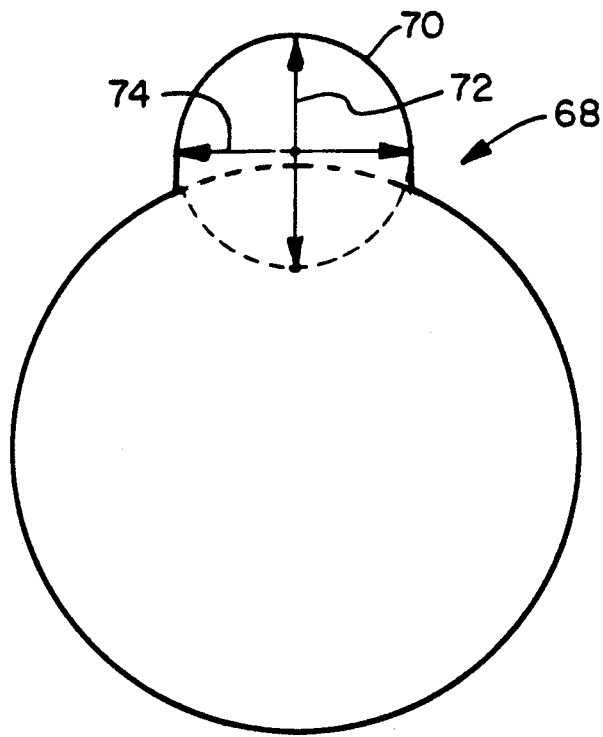
FIG. 4 is a section view similar to FIG. 3, showing a prior art implementation of a semicircular key.

FIG. 4 represents a known arrangement 68 of a semi-circular key formation 70 on a shaft, wherein the aspect ratio $d_1/d_2$ equals 1.0, because $d_1$ and $d_2$ are equal diameters 72,74 of the same circle. In known applications, the typical span angle has been about 15 degrees.

Figure 5:
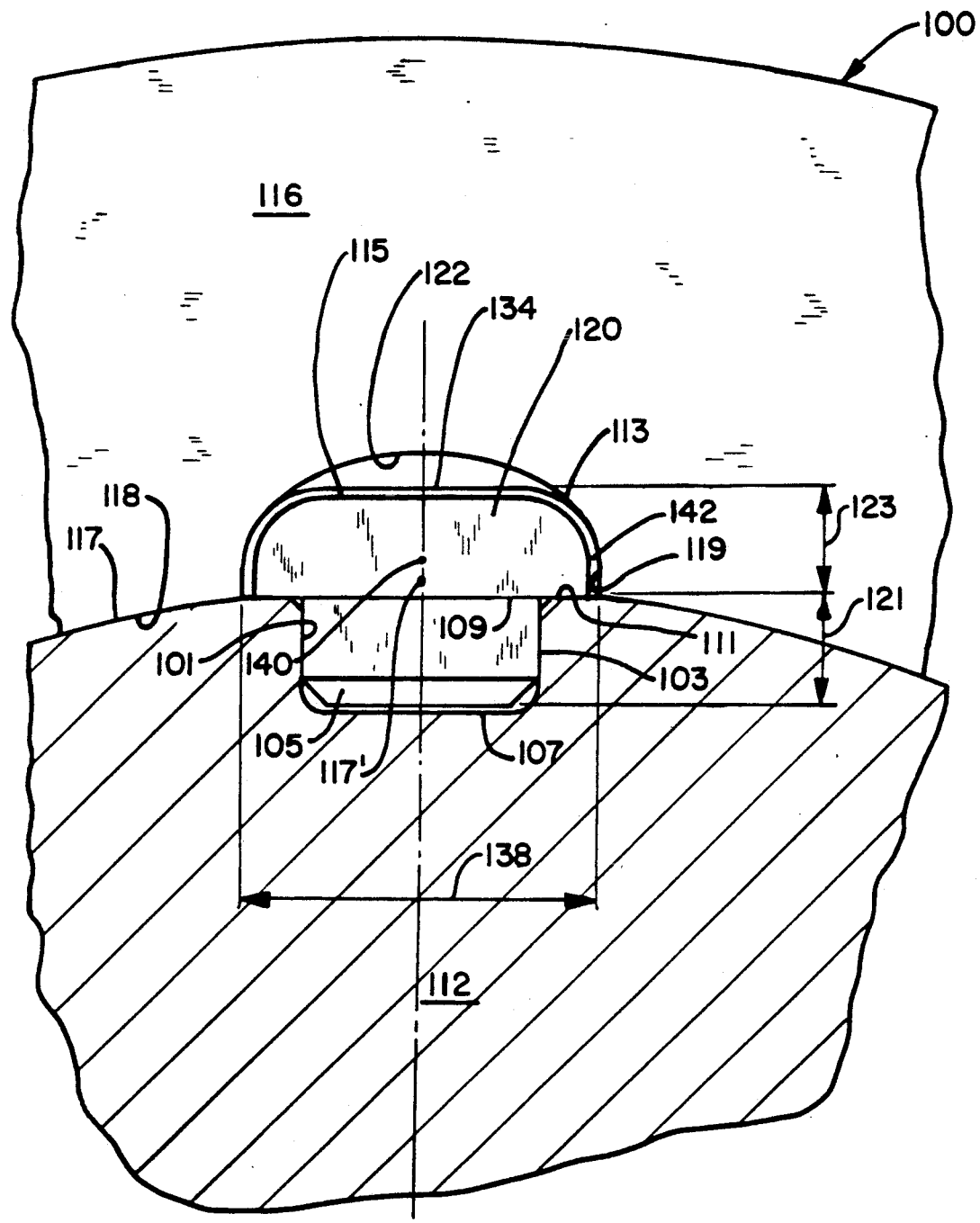
FIG. 5 is a sectional view similar to FIG. 2, of the preferred embodiment of the invention in a disc refiner, having a keyway formed in the shaft, a semi elliptical keyway formed in the hub of the disc, and a key interlocked between the shaft keyway and the bore keyway, for transmitting torque therebetween.

FIG. 5 shows an enlarged view of the preferred embodiment of the invention as implemented at the connection between a shaft and disc of a pulp refiner or the like. In FIG. 5, the last two digits of the even three digit numeric identifiers designate the same or equivalent structure having even two digit numeric identifiers in FIGS. 1 and 2.

The connection 100 includes the shaft 112, which has been secured to disc hub 116 by thermal expansion of the hub, insertion of the shaft, and contraction of the hub in a manner well known in this art. As a result of this thermally-induced interference fit, the perimeter 117 of the shaft and the wall of the bore 118, have been "squeezed" together so tightly that significant stressing of the material occurs. This material is further stressed as the shaft rotates at high speed.

An additional type of interference is also provided in accordance with the invention, in the form of a separate key member 120 disposed in the keyway or groove 101 at the shaft perimeter, and projecting into the keyway recess 122 in hub 116. The bore keyway 122 is substantially semi-elliptical. The presence of recess 122 in the bore wall 118, presents a discontinuity in the material constituting the bore wall and thus produces material stresses in the vicinity of the recess 122, which are locally more concentrated than exists throughout the remainder of the circular portion of bore wall 118.

The initial stress due to the thermally-induced interference fit between the disc 116 and shaft 112 in the vicinity of recess 122, is exacerbated by the additional stresses caused by the rotation of the shaft. The substantially semi-elliptical shape of the recess 122 distributes the stresses arising from the initial interference fit and centrifugal forces, in a more uniform manner across a greater surface area of the recess, than occurs with keyways in the prior art, which tend to concentrate the stresses at or near corners.

In the preferred embodiment, the keyway recess 122 has a keyway major diameter 138 passing through the ellipse center 140, which is slightly radially outward from the point 117' on the completed circumferential surface of the shaft 112. The shaft has an axially extending, flattened portion 111 above which the keyway 122 forms a canopy. The keyway 122 initially extends substantially vertically as shown at 119, from the surface of shaft 112 to approximately the elevation of the ellipse center 140, at which elevation the keyway 122 assumes the curvature of a semi-ellipse. The shaft keyway 101 is preferably in the form of a rectangular channel that extends a depth 121, for receiving the body portion 103 of the key 120. The bottom portion typically is chamfered at 105, and rests in the shaft keyway 101 so as to maintain a slight spacing 107 from the floor of the keyway. This spacing is established by the fact that the cap portion 115 of the key 120, has wing portions that extend laterally outwardly of the body portion 103 so as to rest on the flat surfaces 111 of the shaft, within the canopy formed by the bore keyway 122. The cap portion 115 extends above the shaft flat surface 111, approximately the same distance 123 that the body portion 103 extends into the shaft keyway 101.

The cap portion 115 need not conform precisely with the canopy formed by the bore keyway 122, especially at the apex. It is preferred, however, that the sidewalls 142 of cap 115 conform closely with the initial, straight rise at 119 of the bore keyway 122, and at the shoulders 113 which follow the curvature of the keyway 122 at the transition from the straight walls 119. In general, although the cap portion 115 of the key 120 need not be elliptical, its lateral surfaces should follow the contours of the lateral walls of the keyway 122, as closely as possible so as to distribute the stresses caused by the rotational movement of the shaft, against a relatively wide area of the keyway 122.

It should be appreciated that the present invention as shown in FIG. 5, can be back-fit into existing refiners. After the shaft and disc assembly have been removed from the refiner, the disc is heated in a known manner and removed from the shaft. The bore, existing keyway and bolt holes are checked for cracks. The original, typically rectangular keyway is then modified to the elliptical shape shown in FIG. 5. Usually, the disc keyway 122 is then matched with the key 120 so that the cap portion 115 is flush with, or slightly recessed relative to, the mouth of the keyway 122. Preferably, the keyway 122 is shot peened, the key 120 is placed first in the shaft keyway 101, and then in the bore keyway 122 to verify fit. The disc is then heated to 450° F. or more and the thermally-induced interference fit is achieved in a known manner.

It should be appreciated that, although the preferred embodiment has been described with respect to implementation in a pulp refiner system, the invention is applicable in the more general context of the detachable connection of wheels, discs, rotors, impellers, propellers and the like to a rotatable shaft, by interfering formations. Similarly, although the preferred embodiment provides for the projecting formation to be on the shaft and the complementary recess in the bore, the reverse arrangement is also possible within the scope of the present invention.

What is claimed is:

1. In a disc refiner including a disc having a circular central bore that is connected tightly by thermally induced interference to a rotatable circular shaft, and interlocked to the shaft by complementary formations between the bore and the shaft, the improvement wherein said formations include a key projecting from the shaft and interlocked with a substantially semi-elliptical keyway defined by a recessed wall in the bore, as viewed in a direction parallel to the shaft axis of rotation.

2. The disc refiner of claim 1, wherein the key has a solid, semi-elliptical cross section as viewed in a direction parallel to the shaft axis of rotation.

3. The disc refiner of claim 1, wherein the semi-elliptical keyway recess has its minor axis substantially along a radius of the shaft and its major axis perpendicular to the minor axis.

4. The disc refiner of claim 3, wherein the shaft includes a shaft keyway, and the key is a separate key member having a body portion situated in the shaft keyway and a cap portion situated in the bore keyway recess, said cap portion including an outer shoulder which is closely spaced from and is complementary in shape with at least some of the wall defining the bore keyway recess.

5. The disc refiner of claim 4, wherein said outer shoulder is closely spaced from the wall of the keyway recess where the ellipse major axis intersects the wall of the keyway recess.

6. The disc refiner of claim 3, wherein the aspect ratio of the length $a_1$ of the minor axis to the length $a_2$ of the major axis of the semi-elliptical keyway recess, is within the range $$0.40 \leq a_1/a_2 \leq 0.90.$$

7. The disc refiner of claim 6, wherein the aspect ratio lies in the range $$0.55 \leq a_1/a_2 \leq 0.65.$$

8. The disc refiner of claim 1, wherein the major axis of the semi-elliptical wall of the keyway recess lies entirely outside the circular cross section of the shaft.

9. The disc refiner of claim 8, wherein the keyway recess walls include a pair of opposed side walls extending outwardly from the shaft an equal distance parallel to and on either side of the minor axis of the keyway semi-ellipse, and wherein the major axis of the keyway semi-ellipse passes through the walls at said distance.

10. The disc refiner of claim 1, wherein the key is a separate key member having a body portion situated in the shaft keyway and a cap portion situated in the bore keyway recess, said cap portion including an outer shoulder which is closely spaced from and is complementary in shape with at least some of the wall defining the bore keyway recess.

* * * * *